Jan. 30, 1923. 1,443,615.

C. C. BOWEN.
SELF TILTING COVER.
FILED MAR. 11, 1922.

WITNESSES
Guy M. Spring
J. S. McCathran

Inventor
Claude C. Bowen
By Richard B. Owen
Attorney

Patented Jan. 30, 1923.

1,443,615

UNITED STATES PATENT OFFICE.

CLAUDE C. BOWEN, OF BRAINERD, MINNESOTA.

SELF-TILTING COVER.

Application filed March 11, 1922. Serial No. 542,970.

*To all whom it may concern:*

Be it known that I, CLAUDE C. BOWEN, a citizen of the United States, residing at Brainerd, in the county of Crow Wing and State of Minnesota, have invented certain new and useful Improvements in Self-Tilting Covers, of which the following is a specification.

This invention relates to a self tilting vessel cover, and has for its object the production of a simple and efficient means for attaching the handle to the cover to one side of the central axis thereof. The present invention is an improvement upon my prior Patent Number 1,289,372.

A further object of the invention is to provide a novel self-tilting metal cover in which the handle supporting the cover extends entirely across the same thereby forming a brace therefor, which effectively eliminates undue strain upon the bearings which are utilized for connecting the handle to the cover body.

A still further object of the invention is to provide novel bearings for supporting the handle which embody resilient portions for normally exerting a pressure thereon to prevent lateral slipping of said handle, whereby the handle will be normally maintained in its position off the center line of balance of the body.

Another object of the invention, is the production of a simple handle for supporting the cover in such a manner as to cause the cover to automatically tilt to drain the moisture therefrom when lifted from the kettle or other support.

Other objects and advantages of this invention will appear throughout the following specification and claims.

Figure 1:
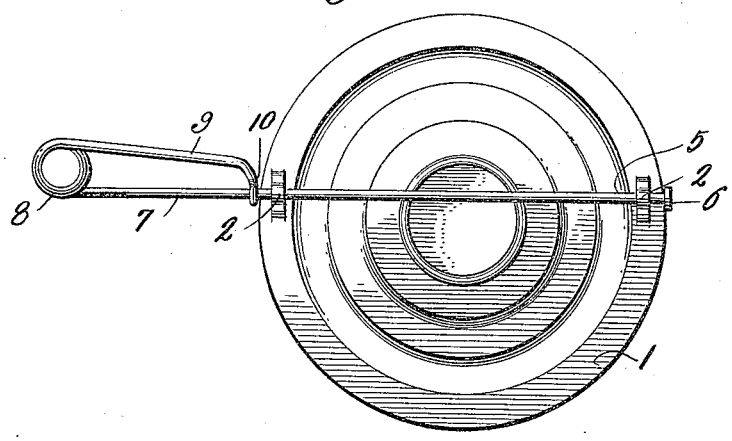
Figure 1 is a top plan view of the cover.
Figure 3:
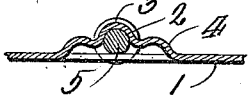
Figure 3 is a section taken on line 3—3 of Figure 2.

By referring to the drawings, it will be seen that 1 designates the cover which is preferably formed of sheet metal and may be made of any suitable design. A pair of diametrically opposite bearings 2 are struck upwardly from the body of the cover 1, near the edge of the cover as shown in Figure 1 of the drawings. Each bearing 2 is provided with a handle receiving socket 3 and an upwardly pressed bow 4 upon each side thereof. This structure is clearly shown in Figure 3. These bow portions 4 will assist in holding the socket portion 3 firmly down upon the handle 5, this action being caused by the spring nature of the bow portions 4.

Figure 2:
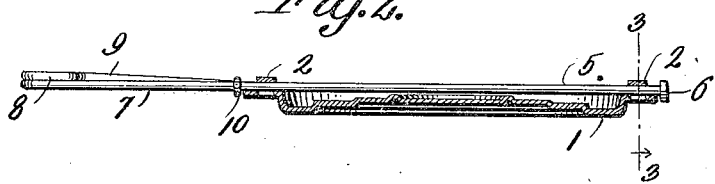
Figure 2 is a longitudinal section through the cover.

The handle 5 is provided with an enlarged head 6 at the outer end thereof, which overhangs the edge of the cover 1 and limits the longitudinal movement of the handle 5 in one direction upon the cover 1. This handle 5 passes through the bearings 2 and rests upon the upper face of the cover 1 as shown in Figure 2. A hand grip 7 is formed on the inner end of the handle 5 and comprises a coil 8 at the extremity thereof, having an inwardly extending bar 9 terminating in an inturned eye 10, which fits around the handle proper, as shown in Figure 2. The bar 9 extends substantially parallel with the handle 5. The eye 10 engages the edge of the cover 1, and in conjunction with the head 6 holds the handle 5 against longitudinal movement upon the cover 1.

From the foregoing description, it will be seen that a very simple and efficient means has been produced for attaching a handle to the cover of a vessel, for causing the cover to tilt automatically as the same is lifted from a vessel or other support, and at the same time cause any moisture collected thereon, to run off therefrom. Should the cover then be placed back upon the vessel, the cover will readily assume its proper position thereon. It should be further understood that the formation of the hand grip 7 will produce a cool handle, and the eye 8 will constitute an efficient means for facilitating the hanging of the cover upon a support when not in use.

It should be further understood that certain detail changes in the mechanical structure may be made in the invention, without departing from the spirit of the invention, so long as these changes fall within the scope of the appended claims.

I claim:

1. A self-tilting cover for cooking vessels comprising a body, aligned bearings struckout from the body adjacent to the opposite sides thereof and arranged off the center line of balance of the body, a straight handle rotatable in said bearings and extending entirely across the body in engagement therewith, a hand grip carried by one end of the handle for engaging one side of the cover and a head carried by the opposite end of the handle for engaging the opposite side of the cover.

2. A self-tilting cover for cooking vessels comprising a disk-shaped body having aligned struck-out bearings formed therein adjacent to the opposite sides thereof arranged off of the center line of balance of the body, said bearings each including a central socket portion and side resilient bow portions, a straight handle disposed in the socket portions of the bearings and extending entirely across the body, a hand grip formed on one end of the handle, and a head formed on the opposite end of the handle.

In testimony whereof I affix my signature in presence of two witnesses.

CLAUDE C. BOWEN.

Witnesses:
   CORA A. DOUGHERTY,
   NEAL CLARK.